United States Patent [19]

Heling et al.

[11] 4,343,508
[45] Aug. 10, 1982

[54] LATCH MECHANISM FOR VEHICLE SEAT CONVERTIBLE TO BED

[75] Inventors: Dennis H. Heling, Canton; Walter Lyszczarz, Westland; Frank J. Sposite, Clinton, all of Mich.

[73] Assignee: Lear Siegler, Inc., Livonia, Mich.

[21] Appl. No.: 113,147

[22] Filed: Jan. 18, 1980

[51] Int. Cl.³ .................. A47C 13/00; A47C 17/16
[52] U.S. Cl. ................... 297/114; 5/37 B;
5/38; 5/55 B; 296/69; 297/64
[58] Field of Search ............ 297/114, 112, 113, 105,
297/63, 64, 65, 66, 67; 5/38, 37 B, 37 R, 37 C,
13, 55 B; 296/66, 69

[56] References Cited

U.S. PATENT DOCUMENTS

| 373,445 | 11/1887 | Decker | 5/38 |
| 650,498 | 5/1900 | Welles | 5/37 C |
| 1,265,073 | 5/1918 | Freedman et al. | 5/55 B |
| 2,582,555 | 1/1952 | Miller | 297/111 |
| 3,807,790 | 4/1974 | Erard | 296/66 |

FOREIGN PATENT DOCUMENTS

| 862960 | 1/1940 | France | 297/114 |
| 572593 | 1/1958 | Italy | 5/3 |

| 1355775 | 6/1974 | United Kingdom | 297/64 |

*Primary Examiner*—James T. McCall
*Attorney, Agent, or Firm*—Reising, Ethington, Barnard, Perry & Brooks

[57] ABSTRACT

A latch mechanism (24) disclosed secures a vehicle seat (10) in a seating position and is selectively releasable to permit movement of cushion, back, and auxliary components (14, 16, 18) on a support linkage (20) to a bed position. The latch mechanism includes a first latch (26) having a latched position for securing the cushion and back components (14, 16) in the seating position. A second latch (28) of the mechanism has a latched position for securing the auxiliary component (18) in a vertical seating position at the rear of the back component. A pair of the first latches are preferably provided at opposite lateral sides of the seat with the second latch therebetween and are releasable in coordination therewith by an actuator (30) of the mechanism to permit unlatching that allows the seat movement to the bed position. A laterally extending connector shaft (96) of the actuator coordinates the releasing of the latches and is pivotally moved by a pedal-actuated member through a pair of cams.

10 Claims, 7 Drawing Figures

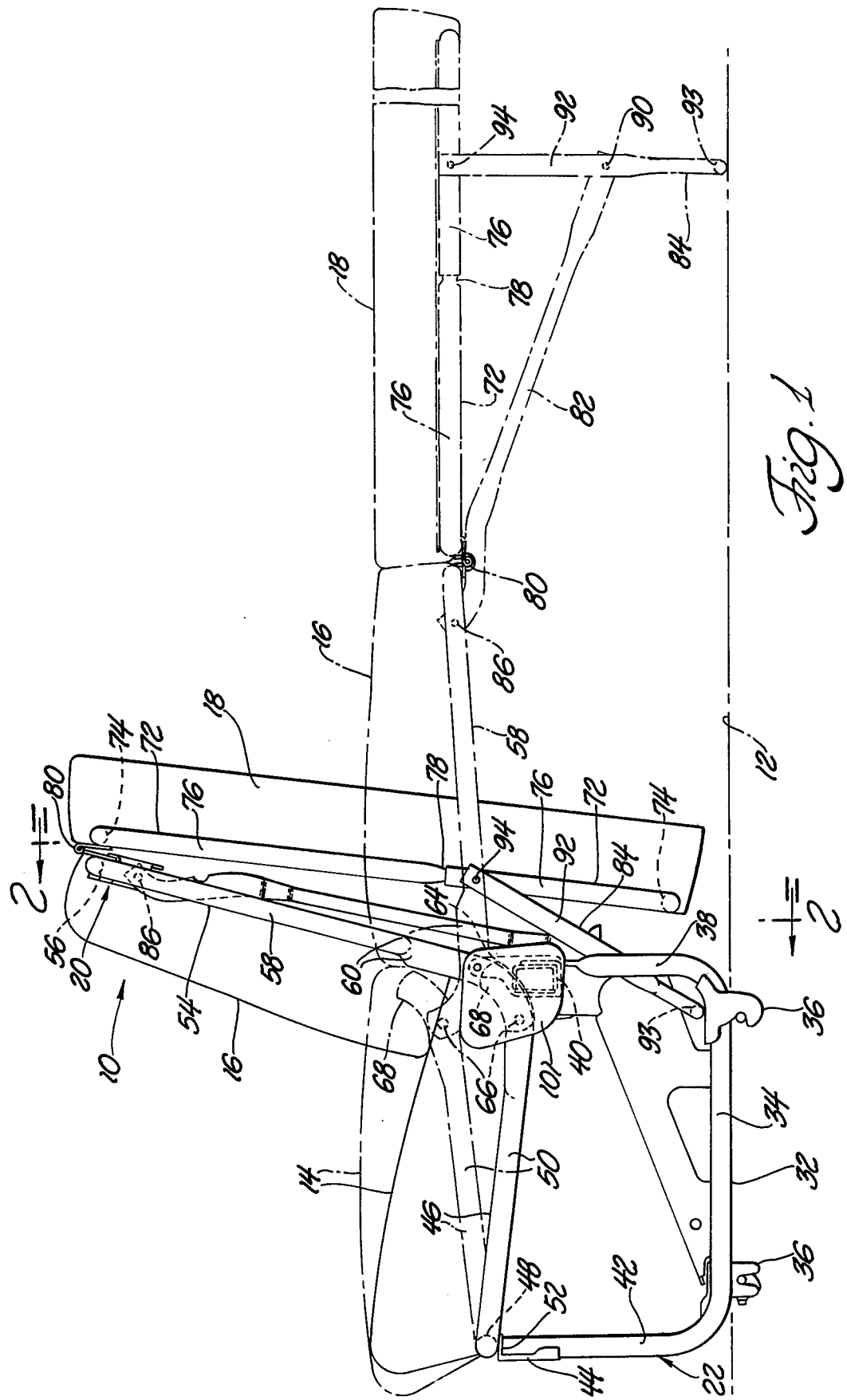

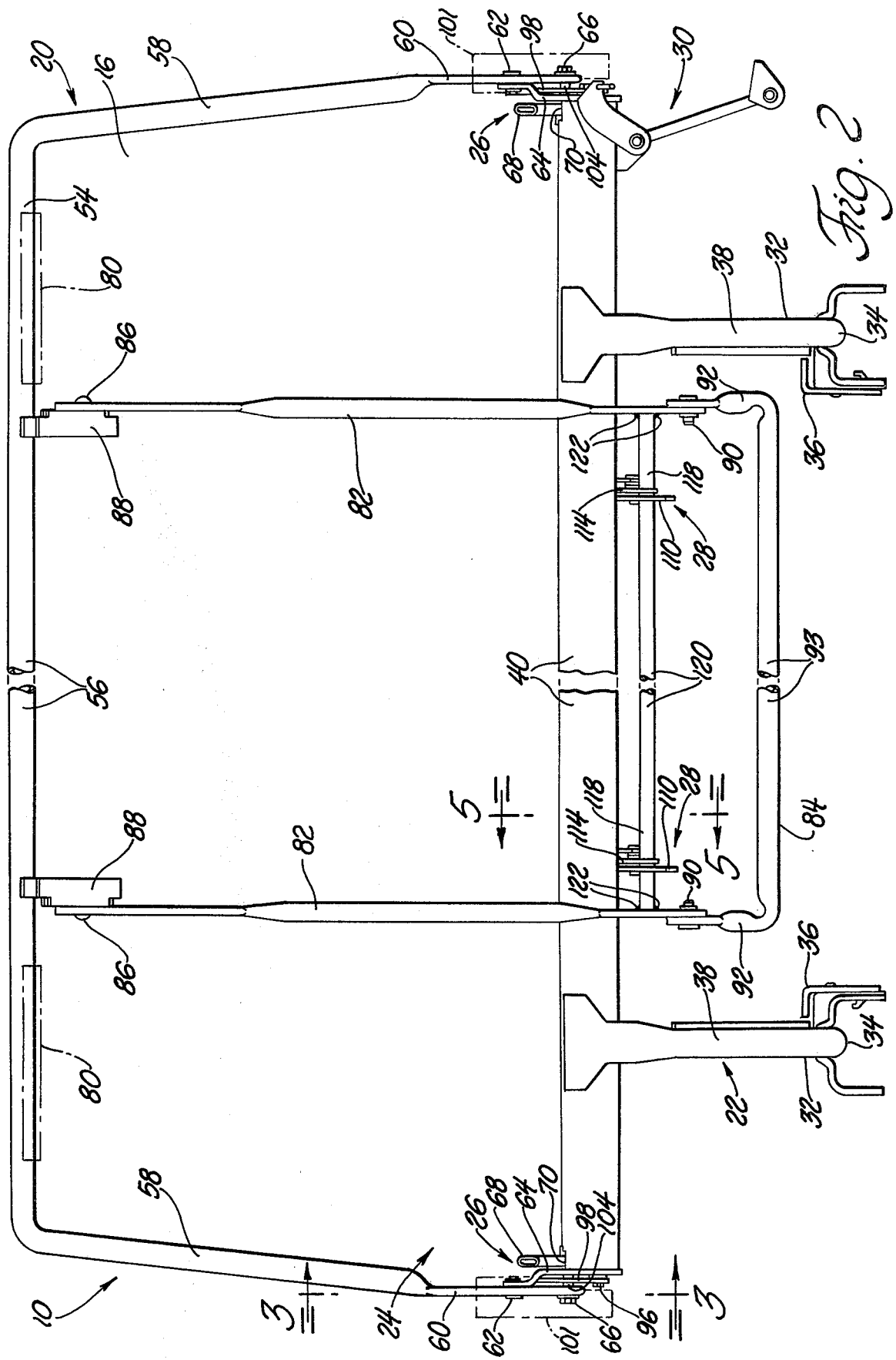

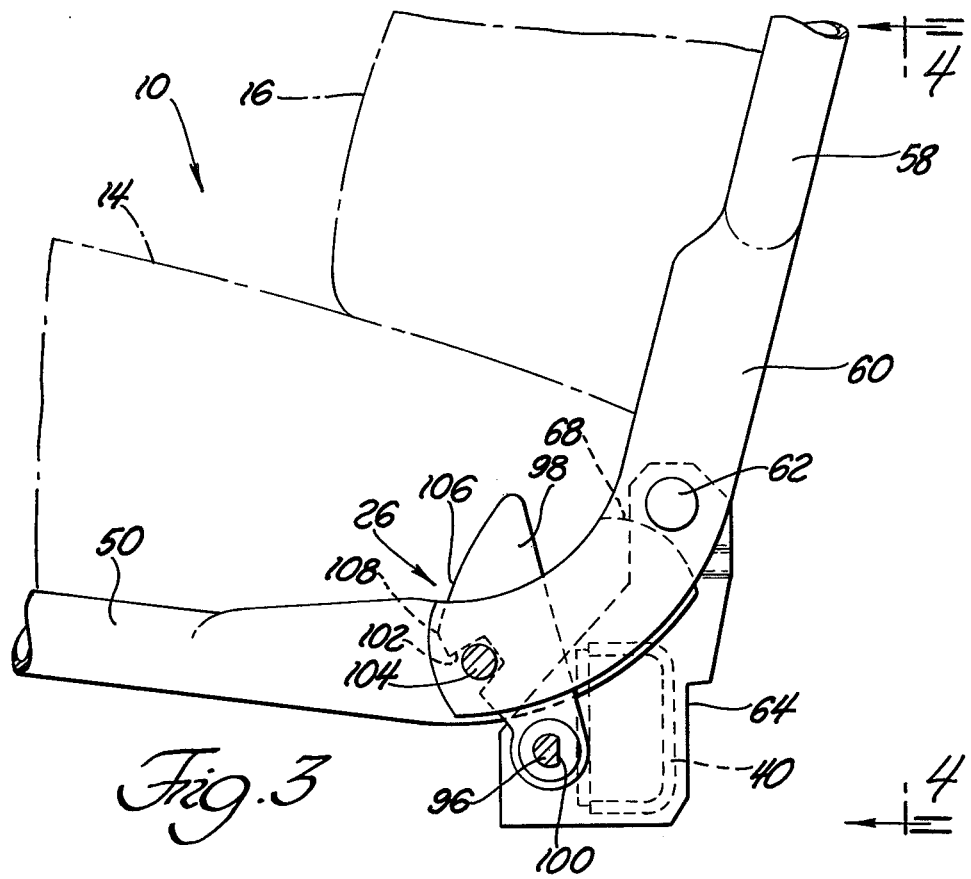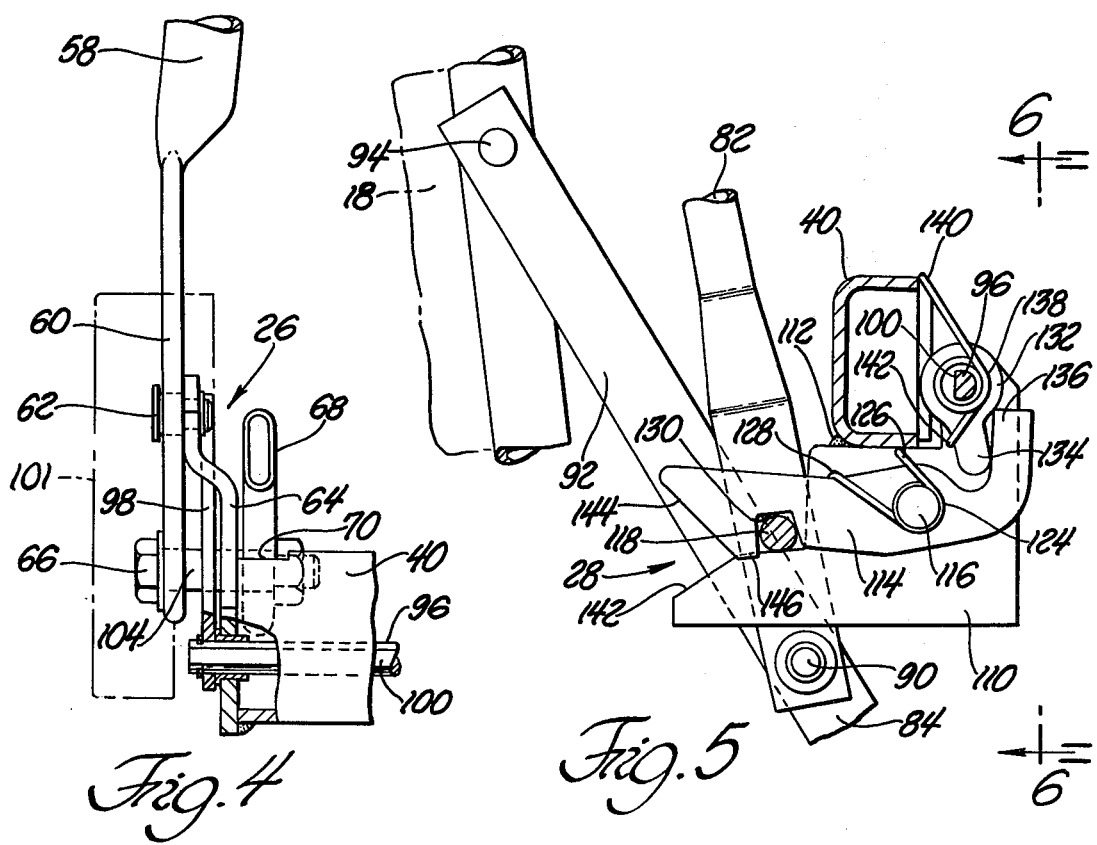

LATCH MECHANISM FOR VEHICLE SEAT CONVERTIBLE TO BED

TECHNICAL FIELD

This invention relates to a latch mechanism for securing a vehicle seat in a seating position and for selectively releasing the seat for movement to a bed position.

BACKGROUND ART

It is well known for vehicle seats to include cushion, back and auxiliary components that are movable between a seating position and a horizontal bed or storage position to provide a bed or cargo area for the associated vehicle. The normal slope of a seat cushion downwardly toward the rear requires that its rear edge be raised during conversion from the seating position to the bed position. Likewise the lower edge of the seat back which is normally connected with the rear edge of the cushion must also be raised upwardly during such conversion. Coordinated movement of the cushion and back components is most often provided by a support linkage including a fixed frame and movable links that support the cushion, back, and auxiliary components for movement between the seating and bed positions.

It is desirable for the cushion, back, and auxiliary components to be securely held in the seating position during vehicle travel. Packaging of vehicle seat latches makes it somewhat difficult to provide the securement of cushion, back and auxiliary seat components in the seating position by a single latch that is releasable to permit conversion of the seat to a bed. While it might seem that the provision of two different latches would allow the seat components to all be held in the seating position, more than one latch requires a more involved maneuver by the operator to effect releasing of the seat for conversion to the bed position.

DISCLOSURE OF INVENTION

An object of the present invention is to provide an improved latch mechanism capable of securely positioning cushion, back, and auxiliary components of a vehicle seat in a seating position and conveniently releasable to permit movement of the seat components to a bed position.

In carrying out the above object, a latch mechanism constructed according to the present invention includes first and second latches for securing cushion, back, and auxiliary components mounted on a support linkage in a seating position and also includes an actuator connected to both the first and second latches and selectively operable to provide unlatching thereof which allows movement of the support linkage and the seat components to a bed position. The first latch has a latched position for securing the cushion and back components in the seating position and has an unlatched position where the cushion and back components are allowed to move to the bed position. The second latch likewise has a latched position for securing the auxiliary component in a vertical seating position at the rear of the back component and has an unlatched position where the auxiliary component is allowed to move to the bed position from the seating position.

In its preferred construction, the latch mechanism includes a pair of the first latches which are respectively mounted on a fixed frame of the support linkage at opposite lateral extremities of the seat. The second latch or a pair of the second latches is also mounted on the fixed frame of the support linkage laterally intermediate the pair of first latches. Unlatching of the first and second latches is performed by operation of the latch actuator which includes a connector extending laterally between the latches. A laterally elongated shaft of the connector is preferably pivotally mounted on the fixed frame of the support linkage and is connected to the latches to provide their coordinated unlatching.

Each of the first and second latches includes a latch member pivotally supported on the fixed frame of the support linkage and a keeper mounted on a movable link of the support linkage such that retention of the keepers by the latch members secures the seat components in the seating position. Each latch member of the pair of first latches is pivotally fixed on an associated lateral end of the connector shaft. Each second latch member is pivotally mounted on the fixed frame and engaged by an unlatching cam on the connector shaft to provide latch member movement from a latched position thereof to an unlatched position thereof so as to release the associated keeper. An unlatching leg is preferably provided on the latch member of each second latch so as to provide the engagement thereof by the associated unlatching cam on the connector shaft. Springs bias the unlatching cams of the second latches into engagement with the associated latch members thereof and also pivotally locate the connector shaft so that the latch members of the first latches are biased toward their latched positions. This spring bias thus moves latch members of the first latches to their latched positions after an operator unlatches the latches and releases the actuator. Springs also bias the latch members of the second latches toward their latched positions so that these latches are ready for latching of their associated keepers when the operator releases the actuator.

Convenient unlatching of the latch mechanism is achieved by a pivotal member of the actuator whose movement pivots the connector shaft to provide unlatching of both pairs of first and second latches. One end of the actuator member is pivotally supported on the fixed frame of the support linkage and the other end thereof includes a foot pedal for providing pivotal movement that releases the latches. The pivotal axis of the actuator member is transverse to the axis of the connector shaft. A first cam is pivotally fixed on the end of the actuator pivotally supported by the frame while a second cam is pivotally fixed to the adjacent end of the connector shaft. Engagement of the first cam with the second cam upon pivoting of the actuator member by the pedal provides pivoting of the connector shaft to unlatch the latches.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a side elevation view illustrating a vehicle seat which includes a latch mechanism constructed in accordance with the present invention to securely position the seat in the seating position shown by solid line representation and to selectively release the seat for movement to the bed position shown by phantom line representation;

FIG. 2 is an elevation view of the seat taken generally along line 2—2 of FIG. 1 and illustrates the laterally spaced relationship between a pair of first latches located at opposite lateral extremities of the seat and a pair of second latches located laterally intermediate the first latches;

FIG. 3 is a transverse elevational view taken along line 3—3 of FIG. 2 and illustrates the construction of the latches located at the lateral extremities of the seat;

FIG. 4 is a side elevational view taken along line 4—4 of FIG. 3 and further illustrates the construction of the latches at the lateral extremities of the seat;

FIG. 5 is a side elevational view taken along line 5—5 of FIG. 2 and illustrates the construction of the latches located intermediate the lateral extremities of the seat;

BEST MODE FOR CARRYING OUT THE INVENTION

Figure 6:
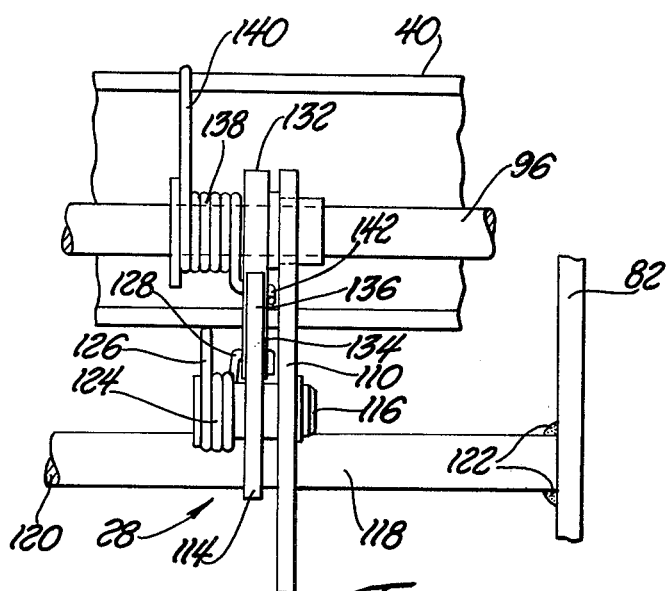
FIG. 6 is an elevation view taken along line 6—6 of FIG. 5 and further illustrates the construction of the latches located intermediate the opposite lateral extremities of the seat.

Referring to FIG. 1 of the drawings, a vehicle seat generally indicated by 10 is mounted on a vehicle floor 12 and is movable between a seating position shown by solid line representation and a generally horizontal bed position shown by phantom line representation. Components of the seat 10 include a cushion 14, a back 16, and an auxiliary component 18 which are all mounted by movable links of a support linkage 20 whose fixed frame 22 is mounted on the vehicle floor 12. As seen by additional reference to FIG. 2, a latch mechanism 24 constructed in accordance with the present invention includes a pair of first latches 26 located at the opposite lateral extremities of the seat and a pair of second latches 28 positioned intermediate the first latches in a laterally spaced relationship to each other. Latches 26 and 28 cooperate to securely position the seat in its seating position and are all connected by an actuator generally indicated by 30 such that operation of the actuator releases the latches to permit movement of the seat to its bed position as is more fully hereinafter described.

With continuing reference to FIGS. 1 and 2, the fixed frame 22 of the support linkage 20 includes a pair of U-shaped tubular frame members 32 which are spaced laterally from each other. A lower connecting portion 34 of each U-shaped frame member includes a pair of conventional catches 36 for securing the frame 22 to keepers on the floor 12. At the rear end of each connecting portion 34, a rear leg 38 of the associated frame member 32 extends upwardly and has an upper end on which an elongated frame member 40 is mounted extending laterally to support the latches of the latch mechanism 24 (FIG. 2) which secures the seat in its seating position. At the front end of the connecting portions 34, associated front legs 42 of the U-shaped frame member extend upwardly and have upper ends which support associated brackets 44 that mount the front edge of the cushion 14.

Support linkage 20 illustrated in FIG. 1 includes movable links that support the cushion 14, back 16, and auxiliary component 18 on the fixed frame 22 for movement between the seating and bed positions. Cushion 14 is supported by a tubular link 46 which has a laterally elongated U shape, when viewed from a plan direction, opening toward the rear. Brackets 44 on the upper ends of front legs 42 support a laterally extending connecting portion 48 of link 46 which also includes link portions 50 extending rearwardly from the opposite lateral ends of the connecting portion. Brackets 44 each have a flexible portion 52 secured to the connecting portion 48 so as to permit pivoting of each link portion 50 between the lower seating position shown by solid line representation and the upper bed position shown by phantom line representation. Such pivoting movement of the link portions 50 moves the cushion 14 from its downwardly inclined orientation to the rear in the seating position to its generally horizontal orientation of the bed position as is more fully hereinafter described.

As seen in FIG. 2, support linkage 20 for the seating component also includes a tubular link 54 which has an inverted U shape elongated in a lateral direction so as to support the top and side edges of the seat back 16. An upper connecting portion 56 of the link 54 extends laterally to support the upper edge of the seat back 16 and has opposite lateral ends from which link portions 58 extend downwardly to support the side edges of the seat back. Each link portion 58 has a flattened lower end 60 pivotally supported by an associated pin 62 on the outboard side of a support plate 64 which is fixedly secured in any suitable manner, such as by welding, to the adjacent end of the fixed frame member 40. As such, movement of the seat back 16 from the generally vertical seating position to the generally horizontal bed position takes place about an axis through the pins 62 at the opposite sides of the seat. The flattened end 60 of each link portion 58 has a somewhat J shape whose distal extremity is secured by a nut and bolt pivot connection 66 to a flattened rear end 68 on the link portion 50 that supports the adjacent lateral side of the seat cushion 14. Link portion ends 68 are located laterally inboard from the support plate 64, as best seen in FIG. 2, and are respectively received within notches 70 in the opposite ends of the fixed frame member 40 to limit the downward movement of the link portions 50 in the clockwise direction of FIG. 1 about the connecting portion 48 and thereby provide the support for the cushion 14 in the seating position shown by solid line representation. Such positioning of the link portions 50 also pivotally locates the link portions 58 on which the seat back 16 is supported against counterclockwise movement about pivot pin 62 by preventing the pivot connection 66 from moving in such direction. However, upon release of the latch mechanism as will be hereinafter described, downward pivoting of the cushion 16 to its horizontal bed position also raises the rear end of the cushion 14 to position the cushion in its horizontal bed position.

Support linkage 20 includes a pair of tubular links 72 shown in FIG. 1 for supporting the auxiliary component 18. Each tubular link 72 has a generally U shape which includes a laterally extending connecting portion 74 and link portions 76 that extend from the opposite ends of the connecting portion. An interfitted joint 78 of the link portion 76 secures the links 72 to each other in order to define an enclosed shape that supports all edges of the auxiliary component 18. Connecting portion 74 of the upper link 72 is pivotally secured by a hinge 80 to the connecting portion 56 of the tubular seat back link 54 so as to be movable from the generally vertical storage condition in the seating position of the seat to the generally horizontal bed position.

Laterally spaced controls links 82 of the support linkage are illustrated in FIGS. 1 and 2 and cooperate to position a leg 84 that supports the auxiliary component 18 in the bed position. As seen in FIG. 2, upper ends of links 82 are pivotally secured by associated pins 86 to a pair of brackets 88 on the rear side of the seat back 16 adjacent its upper edge. Lower ends of the links 82 are pivotally secured by associated pins 90 to laterally spaced portions 92 of the leg 84. A connecting portion 93 of the leg connects the lower ends of the leg portions 92 (FIG. 2) and the upper ends thereof are secured by associated pivot pins 94 (FIG. 1) to the link portions 76 on the lower tubular link 72 of the auxiliary component 18. Counterclockwise pivotal movement of the auxiliary component 18 from the vertical position behind the seat back 16 about the axis of hinge 80 thus pivots the leg 84 for positioning to support the auxiliary component in the bed position. Concomitant pivoting of the seat back 16 clockwise about the pivot axis through pin 62 then also positions the seat back in its horizontal bed position as well as raising the rear edge of the seat cushion 14 to the horizontal bed position in the manner previously described.

As previously mentioned, latch mechanism 24 illustrated in FIG. 2 includes a first pair of latches 26 which are mounted on opposite ends of the fixed frame member 40 and a pair of second latches 28 also mounted on fixed frame member 40 intermediate the first pair of latches. Latches 26 secure the seat cushion 14 and the seat back 16 in the solid line indicated seating position of FIG. 1 against movement toward the phantom line indicated bed position, while latches 28 shown in FIG. 2 pivotally secure the auxiliary component 18 in the solid line indicated stored position of FIG. 1 against pivotal movement about hinge 80 toward the phantom line indicated bed position. Actuator 30 shown in FIG. 2 connects the latches 26 and 28 to permit coordinated releasing thereof by a single actuation in order to permit the conversion of the seat from the seating position to the bed position.

Figure 8:
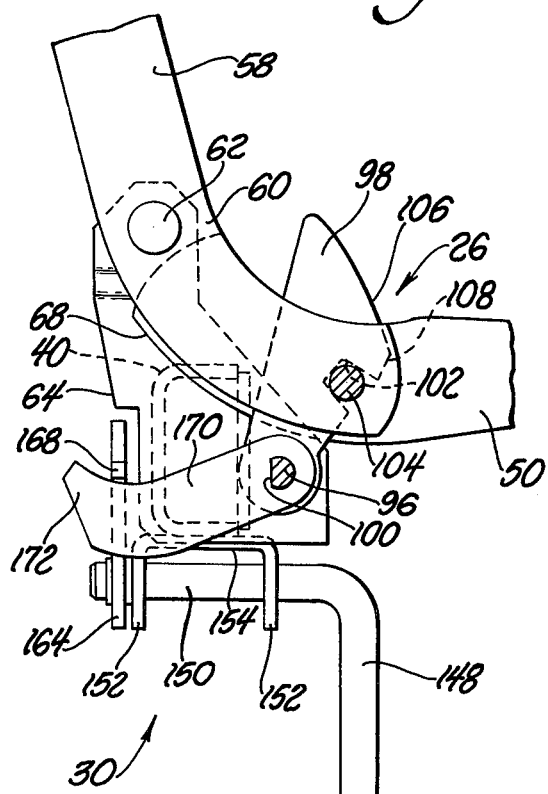
FIG. 8 is an elevation view taken along line 8—8 of FIG. 7 to further illustrate the actuator that releases the latches.

As seen in FIGS. 3, 6, and 8, latch actuator 30 includes a connector embodied by an elongated shaft 96 that extends laterally to connect the latches 26 at each lateral side of the seat and the latches 28 intermediate the lateral sides of the seat. Opposite ends of connector shaft 96 are pivotally supported by suitable bushings on the plates 64 (FIGS. 3 and 8) which are fixed to the opposite ends of the frame member 40. A latch member 98 of each first latch 26 is pivotally fixed on the adjacent end of the connector shaft 96 such that pivoting of this shaft controls unlatching of these latches. As shown, shaft 96 includes a flat surface 100 such that the latch members 98 can be provided with complementary openings for receiving the shaft ends to provide the pivotal fixed relationship thereof on the shaft.

Each latch 26 is received within a housing 101 on the fixed frame of the seat support linkage. The latch members 98 each include a notch 102 for receiving a keeper 104 which is embodied by a bolt of the nut and bolt pivot connection 66 (FIG. 4) that pivotally connects the link portion ends 60 and 68. Thus, retention of each bolt keeper 104 with the latch members 98 in their latched positions as shown in FIGS. 3 and 8 secures link portion ends 60 and 68 to retain the seat cushion 14 and seat back 16 in the seating position. Unlatching pivoting of the connector shaft 96 (clockwise as shown in FIG. 3 and counterclockwise as shown in FIG. 8) moves the latch members 98 to unlatched positions and thereby releases the bolt keepers 104 so as to permit the upward pivoting of the seat cushion 14 and the downward pivoting of the seat back 16 from the solid line indicated seating positions of FIG. 1 to the horizontal bed positions shown by phantom line representation. A spring bias applied to the connector shaft 96 normally pivots the latch members 98 toward their latched positions by applying a force in a counterclockwise direction as shown in FIG. 3 and a clockwise direction as shown in FIG. 8. Upon movement of the seat from the horizontal bed position to the seating position, bolt keepers 104 are moved downwardly and slidably engage cam surfaces 106 on the latch members 98 so as to cam these latch members against the bias of the connector shaft 96 and move down past noses 108 of the latch members into alignment with the notches 102 so that the connector shaft bias then pivots the latch members to the latched positions illustrated and again secures the seat cushion and back in the seating position.

As illustrated in FIGS. 5 and 6, each latch 28 includes a latch plate 110 secured by welds 112 (FIG. 5) to the lower side of the fixed frame member 40. Each latch 28 also includes a latch member 114 pivotally supported by a pin 116 on the latch plate 110 so as to cooperate therewith in securing an associated keeper 118. As seen in FIG. 2, a keeper member 120 has opposite ends defining the keepers 118 and respectively secured to the lower ends of the control links 82 by associated welds 122. Each latch member 114 is biased by an associated spring 124 (FIG. 5) which encircles the pin 116 and has a first leg 126 engaged with the lower side of the fixed frame member 40 and a second leg 128 that is hooked over the top side of the latch member so as to provide downward biasing thereof in a counterclockwise direction to the latched position shown. Keeper 118 is received within a notch 130 in latch member 114 to secure the control links 82 and the leg portions 92 in order to thereby prevent the auxiliary component 18 from pivoting counterclockwise as viewed in FIG. 1 about hinge 80 toward the horizontal bed position.

With reference to FIG. 5, each latch 28 is unlatched by an associated unlatching cam 132 pivotally fixed on the connector shaft 96 at the front side of the fixed frame member 40. A leg 134 of unlatching cam 132 engages an unlatching leg 136 of latch member 114 in order to provide unlatching movement of the latch member. A spring 138 associated with each unlatching cam 132 encircles the connector shaft 96 and has a first leg 140 engaged with the fixed frame member 40 and a second leg 142 hooked over the cam leg 134 in order to bias the connector shaft 96 counterclockwise. As such, the bias provided by the spring 138 associated with each latch 28 maintains the engagement between the cam unlatching leg 134 and the unlatching leg 136 on latch member 114. However, the bias of spring 138 is insufficient to pivot the latch member 114 clockwise about pin 116 against the counterclockwise bias provided by spring 124.

With continuing reference to FIG. 5, counterclockwise actuation of connector shaft 96 pivots the unlatching cam leg 134 counterclockwise and thereby pivots the latch member 114 through its leg 136 in a clockwise direction to an unlatched position so that the keeper 118 is released from the notch 130 and allowed to move toward the left in order to permit the conversion of the seat from its seating position to the horizontal bed position. After such actuation, the bias of spring 124 moves the latch member 114 back to the latched position shown where the latch member remains until the seat is moved back from the bed position to the seating position. Upon such movement, keeper 118 moves into the V-shaped junction defined by a slide surface 142 on the latch plate 110 and a cam surface 144 on the latch member 114. Such movement of the keeper 118 thus pivots the latch member 114 clockwise against the counterclockwise bias of spring 124 until the keeper passes under a nose 146 of the latch member and into alignment with the notch 130 so that the spring bias moves the latch member counterclockwise to the latched position in order to again secure the seat in the seating position.

Figure 7:
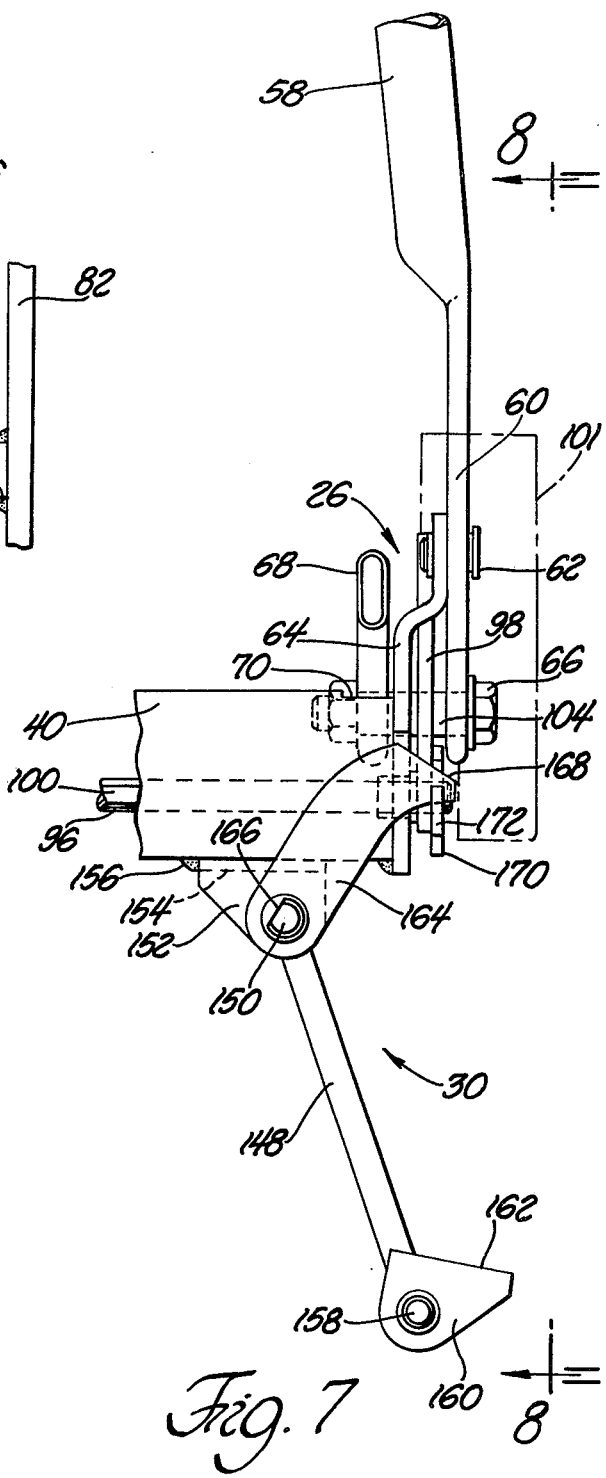
FIG. 7 is an enlarged view of the right extremity of FIG. 2 and illustrates components of an actuator for releasing all of the latches to permit the conversion of the seat from its seating position to its bed position.

With reference to FIGS. 7 and 8, actuator 30 of the latch mechanism 24 includes a pivotal member 148 that provides unlatching pivoting of the connector shaft 96. One end 150 of member 148 is bent at 90° and pivotally supported by downwardly extending legs 152 of a support bracket whose base 154 is secured by welds 156 (FIG. 7) to the lower side of the fixed frame member 40. The other end 158 of actuating member 148 supports the legs 160 of a pedal 162 in order to permit foot actuated pivoting about the end 150 along an axis transverse to the axis of pivoting of connector shaft 96. Actuator 30 also includes a first cam 164 with an end having an opening that receives the distal extremity of the end 150 on actuating member 148 so that the flat surface 166 thereof (FIG. 7) pivotally fixes the cam with respect to the actuating member. A nose 168 of the cam 164 moves downwardly upon depression of the pedal 162, such movement of both the cam and the pedal being in a clockwise direction as viewed in FIG. 7. Actuator 30 also includes a second cam 170 having an end with an opening that receives the connector shaft 96 such that the complementary shapes thereof with the flat surface 100 on the connector shaft provide pivoting of the shaft upon pivoting of the cam. Nose 172 of cam 170 is engaged by the nose 168 of the cam 164 such that the depression of pedal 162 pivots the connector shaft 96 counterclockwise as viewed in FIG. 8 in order to provide unlatching of the latches as has been previously described.

It should be noted that the pivotal position of connector shaft 96 at which unlatching of latches 26 and 28 takes place can be selected so that latches 28 are initially unlatched to permit the auxiliary component 18 to be pivoted rearwardly a certain extent prior to unlatching of the latches 26 which hold the seat cushion and back 14 and 16 in the seating position. Latches 26 are then unlatched to permit completion of the seat movement to the horizontal bed position. However, unlatching of all the latches can be performed by a single actuator due to the connection of the latches by the construction of the latch mechanism described. Also, upon movement back to the seating position, the normal seat movement will first secure the cushion and back 14 and 16 by latching of latches 26, and auxiliary component 18 is thereafter swung forwardly for latching of latches 28.

It should be noted that the latch mechanism 24 can also function satisfactorily with a single latch 28 located intermediate the pair of latches 26.

The improved latch mechanism of this invention thus provides a vehicle seat whose cushion, back, and auxiliary components are securely held in their seating positions while selectively releasable in a convenient fashion for movement to their horizontal bed positions in order to permit use of the seat as a bed. While the best mode for carrying out the invention has been described in detail, other modes for practicing the invention will be apparent to those skilled in the art as defined by the following claims.

What is claimed is:

1. In a vehicle seat including cushion, back, and auxiliary components and also including a support linkage that connects the cushion and back components and mounts the auxiliary component on the back component such that the seat is movable between a seating position where the auxiliary component extends vertically at the rear of the back component and a bed position where the components extend generally horizontally, a latch mechanism for securing the seat in the seating position comprising: a first latch having a latched position for securing the cushion and back components in the seating position and having an unlatched position where the cushion and back components are allowed to move to the bed position from the seating position; a second latch having a latched position for securing the auxiliary component in the vertical seating position at the rear of the back component and having an unlatched position where the auxiliary component is allowed to move to the horizontal bed position from the vertical seating position; and an actuator having a connector that extends between and is connected to both the first and second latches to provide movement thereof from the latched positions thereof to the unlatched positions thereof in order to allow movement of the seat from the seating position to the bed position.

2. In a vehicle seat including cushion, back, and auxiliary components and also including a support linkage that connects the cushion and back components and mounts the auxiliary component on the back component such that the seat is movable between a seating position where the auxiliary component extends vertically at the rear of the back component and a bed position where the components extend generally horizontally, the support linkage including a fixed frame and movable links located at lateral extremities of the seat, a latch mechanism for securing the seat in the seating position comprising: a pair of the first latches respectively mounted by the fixed frame of the support linkage at the opposite lateral extremities of the seat; the pair of first latches having a latched position for securing the cushion and back components in the seating position and having an unlatched position where the cushion and back components are allowed to move to the bed position from the seating position; a second latch having a latched position for securing the auxiliary components in the vertical seating position at the rear of the back component and having an unlatched position where the auxiliary component is allowed to move to the horizontal bed position from the vertical seating position; an actuator connected to the pair of first latches and to the second latches to provide movement thereof from the latched positions thereof to the unlatched positions thereof in order to allow movement of the seat from the seating position to the bed position; and the actuator including a connector that extends laterally between the pair of first latches to coordinate their operation.

3. A seat as in claim 2 wherein the second latch is located on the fixed frame of the support linkage laterally intermediate the pair of first latches and is coupled with the connector in order to coordinate the operation of the second latch with the pair of first latches.

4. A seat as in claim 3 wherein the connector includes a laterally elongated shaft that is pivotally mounted on the fixed frame of the support linkage, the pair of first latches each including a latch member pivotally fixed on the connector shaft, each first latch also including a keeper mounted on a link of the support linkage adjacent the latch member thereof such that the latch members engage the keepers in the latched position thereof to secure the seat in the seating position, the second latch including a latch member pivotally mounted on the fixed frame and a keeper mounted on a support link of the linkage such that engagement thereof in the latched position of the second latch secures the auxiliary component in the vertical position, the latch member of the second latch being coupled with the connector shaft such that shaft rotation provides movement thereof from its latched position to its unlatched position, and the actuator including a member for pivoting the connector shaft thereof to provide unlatching of the latches.

5. A seat as in claim 4 wherein the second latch further includes an unlatching cam pivotally fixed on the connector shaft and engaged with the latch member of the second latch to provide movement thereof to its unlatched position upon rotation of the connector shaft by the actuator member.

6. A seat as in claim 5 wherein the latch member of the second latch includes an unlatching leg engaged by the unlatching cam on the connector shaft to provide movement thereof to its unlatched position.

7. A seat as in claim 4 wherein the latch mechanism includes a pair of the second latches located between the pair of first latches in a laterally spaced relationship to each other.

8. A seat as in claim 4, 5, or 7 wherein the actuator member includes a foot pedal and is pivoted on the fixed frame of the support linkage about an axis transverse to the axis of the connector shaft adjacent one end thereof, a first cam pivotally fixed to the actuator member, and a second cam pivotally fixed to the one end of the connector shaft and engaged by the first cam to provide rotation of the shaft by the pedal movement in order to unlatch the latches.

9. In a vehicle seat including cushion, back, and auxiliary seating components and also including a support linkage having a fixed frame and movable links that connect the cushion and back components and mount the auxiliary component on the back component such that the seat is movable on the fixed frame between a seating position where the auxiliary component extends vertically at the rear of the back component and a bed position where the components extend generally horizontally, a latch mechanism for securing the seat in the seating position comprising: a pair of first latches each of which includes a latch member pivotal on the fixed frame at an associated lateral extremity thereof; each first latch also having a keeper mounted on an adjacent link; the latch member of each first latch having a latched position for engaging and securing the associated keeper to retain the cushion and back components in the seating position and also having an unlatched position where the keeper is released such that the cushion and back components are allowed to move to the bed position from the seating position; a second latch located laterally intermediate the pair of first latches and having a latch member pivotal on the fixed frame and a keeper mounted on an adjacent support link of the linkage; the latch member of the second latch having a latched position for engaging and securing its associated keeper to position the auxiliary component in the vertical seating position at the rear of the back component and also having an unlatched position where its associated keeper is released such that the auxiliary component is allowed to move to the horizontal bed position from the vertical seating position; an actuator including a connector shaft for pivoting the latch members of the first and second latches from the latched positions thereof to the unlatched positions thereof in order to allow movement of the seat from the seating position to the bed position; and the actuator including a pivotal member for pivoting the connector shaft to unlatch the latches.

10. In a vehicle seat including cushion, back, and auxiliary seating components and also including a support linkage having a fixed frame and movable links that connect the cushion and back components and mount the auxiliary component on the back component such that the seat is movable on the fixed frame between a seating position where the auxiliary component extends vertically at the rear of the back component and a bed position where the components extend generally horizontally, a latch mechanism for securing the seat in the seating position comprising: a pair of first latches each of which includes a latch member pivotal on the fixed frame at an associated lateral extremity thereof; each first latch also having a keeper mounted on an adjacent link; each latch member having a latched position for engaging and securing its associated keeper to retain the cushion and back components in the seating position and also having an unlatched position where its associated keeper is released such that the cushion and back components are allowed to move to the bed position from the seating position; a pair of second latches located laterally intermediate the pair of first latches in a laterally spaced relationship to each other; each second latch having a latch member pivotal on the fixed frame and an associated keeper mounted on an adjacent support link of the linkage; the latch member of each second latch having a latched position for engaging and securing the associated keeper to position the auxiliary component in the vertical seating position at the rear of the back component and also having an unlatched position where the keeper is released such that the auxiliary component is allowed to move to the horizontal bed position from the vertical seating position; each second latch including an unlatching leg on the latch member thereof and a pivotal unlatching cam for engaging the latching leg of the associated latch member to provide movement thereof from its latched position to its unlatched position; an actuator including a connector shaft on which the latch members of the first pair of latches are mounted and on which the unlatching cams of the second latches are mounted for pivoting with the connector shaft so as to move the latch members from the latched positions thereof to the unlatched positions thereof in order to allow movement of the seat from the seating position to the bed position; the actuator including a pivotal member having a foot pedal for providing thereof; a first cam pivotally fixed to the pivotal member of the actuator; and a second cam pivotally fixed to one end of the connector shaft and engaged by the first cam to provide rotation of the shaft by pedal movement in order to unlatch the latches.

* * * * *